Patented Jan. 8, 1952

2,581,931

UNITED STATES PATENT OFFICE 2,581,931

STABILIZATION OF RUBBERY MATERIALS BY THE USE OF TIN OR ANTIMONY SALTS OF PHENOL REACTION PRODUCTS

Harry E. Albert, Akron, Ohio, assignor to The Firestone Tire & Rubber Company, Akron, Ohio, a corporation of Ohio No Drawing. Application March 17, 1949, Serial No. 82,009

28 Claims. (Cl. 260—45.75)

1

This invention relates to new stabilizers and includes their use in the stabilization of rubber and rubber-like copolymers such as that known as GR-S, which is a copolymer of 1,3-butadiene and styrene. The copolymers which may be stabilized include, for example, the rubber-like copolymers of a conjugated-diene monomer—for example, 1,3-butadiene, isoprene, 2-cyanobutadiene-1,3, cyclopentadiene, piperylene, dimethylbutadiene-1,3,2-methyl-1,3-pentadiene, etc.—and a vinyl aromatic monomer—for example, styrene, alpha-methyl styrene, nuclear-substituted styrenes, monochlorostyrene, dichlorostyrene, vinylnaph-thalene, vinylbiphenyl, vinylcarbazole, 2-vinyl-5-ethylpyridine, 2-ethyl-5-vinylpyridine, etc.

The stabilizers used are of the class consisting of the stannous and antimony salts of phenol-aldehyde reaction products, and phenol-ketone reaction products. They include salts which contain an equivalent amount of the metal, as for example,

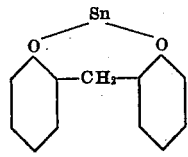

and those containing less than equivalent amount, as for example,

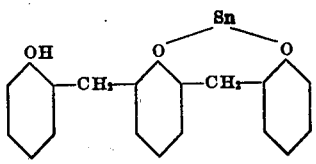

and basic salts, as for example,

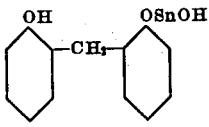

The reaction products of aldehydes have the general formula

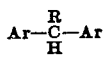

2 or are homologues thereof, and the reaction products of ketones have the general formula

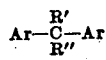

or are homologues thereof, when Ar is the phenol residue, R in the first formula is hydrogen or the alkyl or aryl group connected to the aldehyde carbon, and R' and R" in the second formula are the alkyl or aryl group connected to the ketone carbon. The homologues include more phenol nuclei, all such nuclei being connected as indicated. More generally the reaction products may be defined as a chain of phenol nuclei connected by alkylidene or arylidene groups. The condensation may be effected between any molecular proportions of the phenol and ketone or aldehyde. Catalysts may or may not be used. The salts are obtainable only with those reaction products which are soluble, i. e., either in water or an organic solvent. The insoluble reaction products do not form salts.

Although generally the aldehyde employed will be formaldehyde, other aldehydes may be used, such as, for example, acetaldehyde, butyralde-hyde, propionaldehyde, benzaldehyde, etc.

The ketones which may be employed include, for example, acetone, cyclohexanone, methylethyl ketone, etc.

The phenols which may be used in producing useful reaction products with either an aldehyde or a ketone include, for example:

p-Phenylphenol
p-Tert-amylphenol
4,6-di-tert-butyl-m-cresol
4,6-di-tert-butylphenol
o-Amylphenol
2,4-diamylphenol
Beta-naphthol
Alpha-naphthol
p-Tert-octylphenol
p-Tert-dodecylphenol
p-Heptylphenol
2-methyl-4-amylphenol
2-methyl-4-isobornylphenol
o-Phenylphenol The reaction products from which the salts may be obtained include, for example, the reaction product of phenol and cyclohexanone which produce 1,1-bis(p-hydroxyphenyl) cyclohexane; the reaction product of phenol and acetone which produce 2,2-bis(p-hydroxyphenyl) propane; the reaction product of p-tert-amylphenol and butyraldehyde; the reaction product of p-tert-butylphenol and acetaldehyde; the reaction product of beta-naphthol and acetone; etc.

The following examples illustrate the preparation of the salts of reaction products which may be utilized:

EXAMPLE 1

STANNOUS SALT OF REACTION PRODUCT OF P-CRESOL AND FORMALDEHYDE

Fifty grams of p-cresol, 32 grams of 37 per cent formaldehyde, and 1 gram of concentrated hydrochloric acid were heated gradually to boiling and then refluxed for two hours. The water and acid in were evaporated, and the temperature rapidly raised to 200° C. The resin was poured into an evaporating dish where it was allowed to cool. It was a light amber, friable solid, soluble in acetone, benzene, and sodium hydroxide solution. Ten and eight-tenths grams of this product were dissolved in a solution prepared by dissolving 2.3 grams of sodium in 300 cubic centimeters of 200-proof alcohol. To this was added with stirring a solution of 11.3 grams of stannous chloride dihydrate in 100 cubic centimeters of 200-proof alcohol. The light yellow product was filtered and dried. It was leached with water to remove any sodium chloride present. The product sintered at 125–135° C. and melted with some effervescence at 175–200° C. to a light tan liquid. Tin=33.5%.

EXAMPLE 2

STANNOUS SALT OF REACTION PRODUCT OF 4-SEC-BUTYLPHENOL AND FORMALDEHYDE

To mols of 4-sec-butylphenol were condensed with one mol of formaldehyde using sodium hydroxide as the catalyst. A portion of the above product (50 grams) was dissolved in a solution prepared by dissolving 6.3 grams of sodium in 400 cubic centimeters of absolute methanol. To this was added a solution of 57.7 grams of stannous chloride in 150 cubic centimeters of absolute methanol. The white precipitate was filtered, dried, and leached with water to remove any sodium chloride present. On heating on a spatula, the product gradually became dark brown and then became light gray in color when the spatula was a dull red. The product did not melt. Tin=51.6%.

EXAMPLE 3

ANTIMONY SALT OF REACTION PRODUCT OF 4-TERT.-BUTYL-3-METHYLPHENOL AND FORMALDEHYDE

One hundred and sixty-four grams of 4-tert.-butyl-m-cresol was mixed with 80 grams of 10 per cent sodium hydroxide. To this was added 37.5 grams of 40 per cent formaldehyde slowly during stirring at room temperature and the aqueous layer was separated and discarded. The organic layer was made slightly acid to litmus with acetic acid and taken up in benzene. The benzene solution was dried over anhydrous calcium chloride and the product was obtained as a residue by evaporating the benzene under reduced pressure after separation of the calcium chloride.

Thirty-four grams of the above product was dissolved in 100 cc. of absolute methanol. A solution of 4.6 grams of metallic sodium in 100 cc. of cold methanol was then added. After about one-half hour, a solution of 153 grams of $SbCl_3$ in 65 cc. of methanol was added. The product was obtained as a yellowish-cream semi-solid by evaporation of the methanol and leaching with water to remove the sodium chloride.

The stannous salt was prepared in the same manner, using anhydrous stannous chloride instead of the antimony chloride. On analysis the salt gave 28.6% of tin.

Stannous and antimony salts are obtained from the ketone-phenol reaction products by similar procedures. Generally, it is desirable to convert to the metal salt of either the phenolaldehyde or -ketone reaction product under anhydrous conditions although active stabilizers are obtained when water is present in the reaction medium. In the presence of water, the reaction product undoubtedly contains larger quantities of basic salts than are obtained when an attempt is made to eliminate water.

Stabilization of GR–S

The following tests refer to the use in GR-S of stabilizers prepared as described. The stabilizer is preferably added to a latex of the rubber-like copolymer of 1,3-butadiene and styrene so as to be effective during drying and any storage of the copolymer as well as all subsequent steps in the preparation of the vulcanizate, its storage, and use. About 2 parts of the stabilizer per 100 parts of the copolymer has been found satisfactory, and in each of the tests recorded below that amount is used with the same amount of any control employed. The controls used were phenyl-beta-naphthylamine and a commercial stabilizer referred to as stabilizer A. In practice, from 0.1 to 10 per cent of a stabilizer, more or less, will generally be employed.

The first table shows the stabilizing effect during drying and aging of the stannous salt of Example 1 on the uncured coagulum obtained from GR–S latex—i. e., the latex of a rubber-like copolymer of 1,3-butadiene and styrene resulting from emulsion copolymerization thereof. The coagulum was obtained by treatment of the stabilized latex with crude aluminum sulfate. In recording the results of the test, the color of each copolymer sample is noted, together with the results of hand tests on each sample. These hand tests consisted of feeling and pulling the samples to detect signs of deterioration, such as stiffening, softening, etc.

TABLE I.—COPOLYMER STABILIZATION

| Stabilizer | After Drying 20 Hours at 75° C. | | After Heat-Aging at 90° C. | | | |
|---|---|---|---|---|---|---|
| | Color | Hand test | 1 Day, Hand test | 2 Days, Hand test | 3 Days, Hand test | 4 Days, Hand test |
| Stannous salt of Example 1. | Cream | No deterioration | Unchanged | Slightly set up | Slightly set up | Slightly set up. |
| Phenyl-beta-naphthylamine. | Brown | do | Slightly set up | Somewhat set up. | Somewhat set up. | Somewhat set up. |

The above shows the superiority of the stannous salt of a phenol-aldehyde reaction product over phenyl-beta-naphthylamine in both preservation of the original plasticity of the GR–S copolymer and preservation of its color.

The second table records the results of similar tests on coagulum obtained from GR–S latex with low-iron aluminum sulfate using 2 per cent of the antimony salt of 4-tert-butyl-3-methylphenol-formaldehyde reaction product prepared according to Example 3 and the stannous salt of the same reaction product. The same control is used.

amine were separately compounded according to the following formula:

*Formula*

| | |
|---|---|
| Copolymer containing 2 parts of stabilizer | 100.00 |
| Coal-tar softener | 3.00 |
| Pine tar | 3.00 |
| Stearic acid | 3.00 |
| Zinc oxide | 5.00 |
| Accelerator | 1.20 |
| Channel black | 50.00 |
| Sulfur | 2.00 |

Vulcanizates cured 40, 60, 80 and 120 minutes at

TABLE II.—COPOLYMER STABILIZATION

| Stabilizer | After Drying 20 Hours at 75° C. | | After Heat-Aging at 110° C. | | | |
|---|---|---|---|---|---|---|
| | Color | Hand Test | Two Days | | Four Days | |
| | | | Color | Hand Test | Color | Hand Test |
| Antimony salt of Example 3 | Very light brown | No deterioration | Very light brown. | No change | Light brown | Slightly set up. |
| Corresponding stannous salt | Medium light gray | do | Light yellow-brown. | do | Yellow-brown | Unchanged. |
| Phenyl-beta-naphthylamine | Red-brown | do | Brown | do | Dark brown | Slightly set up. |

The results recorded in the table show the very good protection afforded to the GR–S copolymer by the stannous and antimony salts of a phenol-aldehyde reaction product.

The following table records the results of similar tests conducted with the stabilizer of Example 2 on coagulum obtained by coagulation of GR–S latex with low-iron aluminum sulfate. The control used is stabilizer A instead of phenyl-beta-naphthylamine.

280° F. were tested for physical properties, and averages of the values obtained are recorded in the following table in which modulus and tensile strength are referred to in pounds per square inch and elongation is expressed in percentages.

TABLE IV.—PHYSICAL PROPERTIES OF VULCANIZATE

| Stabilizer | 300% Modulus | | Tensile | | | Elongation | | |
|---|---|---|---|---|---|---|---|---|
| | Normal | Aged | Normal | Aged | Percent of Normal | Normal | Aged | Percent of Normal |
| Stannous salt of Example 1 | 760 | 1,495 | 2,330 | 2,320 | 99.5 | 650 | 445 | 68.5 |
| Phenyl-beta-naphthylamine | 1,010 | 1,755 | 2,730 | 2,550 | 93.5 | 610 | 415 | 68.0 |

The aging referred to is aging at room temperature for two years.

The above data show the stannous salt of Example 1 to be roughly equivalent to phenyl-

TABLE III.—COPOLYMER STABILIZATION

| Stabilizer | After Drying 20 Hours at 75° C. | | After Heat-Aging at 110° C. | | | |
|---|---|---|---|---|---|---|
| | Color | Hand Test | Two Days | | Four Days | |
| | | | Color | Hand Test | Color | Hand Test |
| Stannous salt of Example 2 | Very light pinkish-brown. | No deterioration | Medium light brown. | No change | Medium brown. | No change. |
| Stabilizer A (control) | Dark gray | do | Gray-brown | do | Gray-brown | Somewhat set up. |

The above results show the relative superiority of a stannous salt of a phenol-aldehyde reaction product as a nondiscoloring stabilizer for a copolymer of this general type.

Copolymers containing 2 parts of the stannous salt of Example 1 and phenyl-beta-naphthylbeta-naphthylamine in its effect on the physical properties of the vulcanizate.

*Stabilization of natural rubber*

Natural rubber was compounded according to the following formula for test against a blank of the same formula but omitting the stabilizer:

| | |
|---|---:|
| Rubber | 100.20 |
| Blue dye | 0.10 |
| Zinc oxide | 71.50 |
| Titanium dioxide | 19.90 |
| Insoluble sulfur | 3.10 |
| Stearic acid | 1.20 |
| Benzothiazyl disulfide | 0.38 |
| Di-butyl-ammonium oleate | 0.48 |
| Wax | 2.00 |
| Stabilizer | 1.00 |

The stocks were cured 20, 40, 60 and 80 minutes at 280° C. Samples of all the various stocks were tested and averages of the values obtained are recorded in the following table (except that weathering tests were made only on the optimum cures):

TABLE V

| Stabilizer | Blank | Stannous salt (Example 2) |
|---|---|---|
| Flex Life: | | |
| Total | 31 hours, 25 minutes. | 33 hours, 14 minutes. |
| Index | 100 | 104 |
| Flex Cracking: | | |
| Total | 142 | 138 |
| Cracks/hour | 2.23 | 2.08 |
| Index | 100 | 107 |
| Sunlamp exposure: | | |
| Original color | White | White. |
| Color after 16 hours | do | Do. |
| Weatherometer exposure—Color after 4 hours. | do | Do. |

The values for the flexing tests are averages of the values obtained on unaged and aged materials by standard tests. The "Flex Life" is the total time the tested strips withstood flexing, and is expressed in hours and minutes. The table shows that the stabilized rubber has longer flex life and better resistance to cracking than the unstabilized rubber. The exposure tests show the stabilizers are of the non-discoloring type.

The examples and tests are illustrative. The stannous and the antimony salts of the reaction products of a phenol with either an aldehyde or a ketone or both, may be used for stabilization of natural rubber and the rubbery copolymers. The stabilizer will normally be used in amounts from 0.1 to 10.0 per cent of the rubber or copolymer, and may be used in mixtures with other stabilizers. Modifications may be made in the procedure disclosed and in the products used and treated within the scope of the appended claims.

What I claim is:

1. Material of the class consisting of rubber and rubbery copolymer of conjugated-diene monomer and vinyl aromatic monomer stabilized with a salt of the class consisting of stannous and antimony salts of the soluble reaction products of a phenol and reactant of the class consisting of adehydes and ketones.

2. Natural rubber stabilized with a salt of the class consisting of stannous and antimony salts of the soluble reaction products of a phenol and reactant of the class consisting of aldehydes and ketones.

3. Coagulum from latex of rubbery copolymer of conjugated-diene monomer and vinyl aromatic monomer obtained by emulsion copolymerization thereof, which coagulum is stabilized by the presence therein of a salt of the class consisting of stannous and antimony salts of the soluble reaction products of a phenol and reactant of the class consisting of aldehydes and ketones.

4. Coagulum from latex of rubbery copolymer of 1, 3-butadiene and styrene obtained by coagulation of emulsion resulting from emulsion copolymerization thereof, which coagulum is stabilized by the presence therein of the stannous salt of a soluble reaction product of a phenol and reactant of the class consisting of aldehydes and ketones.

5. Coagulum from latex of rubbery copolymer of 1, 3-butadiene and styrene obtained by coagulation of emulsion resulting from emulsion copolymerization thereof, which coagulum is stabilized by the presence therein of the antimony salt of a soluble reaction product of a phenol and reactant of the class consisting of aldehydes and ketones.

6. Vulcanizate of the class consisting of sulfur-vulcanized rubber and rubbery copolymer of conjugated-diene monomer and vinyl aromatic monomer stabilized by the presence therein of a salt of the class consisting of stannous and antimony salts of the soluble reaction products of a phenol and a reactant of the class consisting of aldehydes and ketones.

7. Sulfur-vulcanized rubber stabilized by the presence therein of a stannous salt of a soluble reaction product of a phenol and reactant of the class consisting of aldehydes and ketones.

8. Sulfur-vulcanized rubber stabilized by the presence therein of an antimony salt of a soluble reaction product of a phenol and reactant of the class consisting of aldehydes and ketones.

9. Sulfur-vulcanized, rubbery copolymer of 1, 3-butadiene and styrene stabilized by the presence therein of the stannous salt of a phenol and a soluble reaction product of a phenol and reactant of the class consisting of ketones and aldehydes.

10. The method of vulcanizing rubber which comprises curing the same with sulfur in the presence of a stabilizer of the class consisting of the stannous and antimony salts of the soluble reaction products of a phenol with reactant of the class consisting of aldehydes and ketones.

11. The process of vulcanizing rubbery copolymer of conjugated-diene monomer and vinyl-aromatic monomer which comprises curing the same with sulfur in the presence of a salt of the class consisting of the stannous and anti-mony salts of the soluble reaction products of a phenol with reactant of the class consisting of the aldehydes and ketones.

12. The process of vulcanizing rubber which comprises curing the same with sulfur in the presence of a stabilizer of the class consisting of the stannous and antimony salts of a soluble reaction product of a phenol and formaldehyde.

13. The process of vulcanizing rubber which comprises curing the same with sulfur in the presence of a stabilizer of the class consisting of the stannous and antimony salts of a soluble reaction product of a butyl phenol and formaldehyde.

14. The process of vulcanizing rubbery copolymer of 1, 3-butadiene and styrene which comprises curing the same in the presence of a stabilizer of the class consisting of the stannous and antimony salts of the soluble reaction products of a phenol and formaldehyde.

15. The process of vulcanizing rubbery copolymer of 1, 3-butadiene and styrene which comprises curing the same in the presence of a stabilizer of the class consisting of the stannous and antimony salts of the soluble reaction products of a butyl phenol and formaldehyde.

16. Stabilizers of the class consisting of the stannous and antimony salts of the soluble reaction products of a phenol and reactant of the class consisting of the aldehydes and ketones.

17. Stannous salts of the soluble reaction products of a phenol and an aldehyde.

18. Antimony salts of the soluble reaction products of a phenol and an aldehyde.

19. Stannous salt of soluble

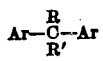

in which each Ar is a phenol residue, R is from the group consisting of hydrogen, alkyl and aryl groups, and R' is from the group consisting of alkyl and aryl groups.

20. Stannous salt of a soluble phenol-formaldehyde reaction product.

21. Stannous salt of a soluble chain of phenol nuclei connected by alkylidene groups.

22. Stannous salt of a soluble chain of phenol nuclei connected by arylidene groups.

23. Stannous salt of a reaction product of a butylphenol and formaldehyde.

24. Stannous salt of the reaction product of two mols of butylphenol and one mol of formaldehyde using an alkaline catalyst.

25. Antimony salt of

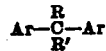

in which each Ar is a phenol residue, R is from the group consisting of hydrogen, alkyl and aryl groups, and R' is from the group consisting of alkyl and aryl groups.

26. Antimony salt of a phenol-formaldehyde reaction product.

27. Antimony salt of a chain of phenol nuclei connected by alkylidene groups.

28. Antimony salt of a chain of phenol nuclei connected by arylidene groups.

HARRY E. ALBERT.

REFERENCES CITED

The following references are of record in the file of this patent:

UNITED STATES PATENTS

| Number | Name | Date |
|---|---|---|
| 2,270,959 | Murke et al. | Jan. 27, 1942 |
| 2,310,449 | Lightbown et al. | Feb. 9, 1943 |
| 2,459,063 | Cook et al. | Jan. 11, 1949 |

OTHER REFERENCES

Synthetic Resins and Their Plastics, Ellis, 1923, New York, page 108.